US009124962B2

(12) United States Patent
Saito

(10) Patent No.: US 9,124,962 B2
(45) Date of Patent: Sep. 1, 2015

(54) WIND NOISE SUPPRESSOR, SEMICONDUCTOR INTEGRATED CIRCUIT, AND WIND NOISE SUPPRESSION METHOD

(75) Inventor: Mutsumi Saito, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 610 days.

(21) Appl. No.: 13/458,313

(22) Filed: Apr. 27, 2012

(65) Prior Publication Data

US 2012/0288116 A1 Nov. 15, 2012

(30) Foreign Application Priority Data

May 11, 2011 (JP) ................................. 2011-106394

(51) Int. Cl.
*H04B 15/00* (2006.01)
*H04R 3/00* (2006.01)

(52) U.S. Cl.
CPC .............. *H04R 3/00* (2013.01); *H04R 2410/07* (2013.01); *H04R 2430/03* (2013.01)

(58) Field of Classification Search
CPC ............................ H04R 2410/07; H04R 1/086
USPC .................. 381/91–92, 94.1–94.3, 94.7, 359; 704/226
See application file for complete search history.

(56) References Cited

U.S. PATENT DOCUMENTS

| | | | | |
|---|---|---|---|---|
| 5,568,559 | A * | 10/1996 | Makino | 381/98 |
| 7,760,888 | B2 | 7/2010 | Kanamori et al. | |
| 8,108,210 | B2 | 1/2012 | Cho | |
| 2006/0233391 | A1* | 10/2006 | Park et al. | 381/94.2 |
| 2007/0030989 | A1* | 2/2007 | Kates | 381/317 |
| 2008/0317261 | A1* | 12/2008 | Yoshida et al. | 381/94.1 |
| 2011/0135126 | A1 | 6/2011 | Gozen | |
| 2012/0191447 | A1* | 7/2012 | Joshi et al. | 704/226 |

FOREIGN PATENT DOCUMENTS

| | | | |
|---|---|---|---|
| CN | 1926911 | A | 3/2007 |
| CN | 101000769 | A | 7/2007 |
| JP | 04-348000 | | 12/1992 |
| JP | 6-269084 | A | 9/1994 |
| JP | B-3186892 | | 7/2001 |
| JP | A-2001-352594 | | 12/2001 |
| JP | A-2008-263483 | | 10/2008 |
| JP | A-2009-055583 | | 3/2009 |
| WO | 2010/140358 | A1 | 12/2010 |

OTHER PUBLICATIONS

Chinese Office Action issued on Apr. 3, 2014 for corresponding Chinese Application No. 201210150149.9, with English Translation, 10 pages.
JPOA—Office Action mailed Oct. 21, 2014 for corresponding Japanese Application No. 2011-106394, with English Translation of relevant part: p. 1 line 17 to p. 2 line 24 and p. 2 line 28 to line 32.
JPOA—Office Action mailed Jun. 2, 2015 for corresponding Japanese Application No. 2011-106394, with English Translation of relevant part: p. 1 line 28 to p. 2 line 13 and p. 2 line 17 to 21.

* cited by examiner

*Primary Examiner* — Joseph Saunders, Jr.
*Assistant Examiner* — James Mooney
(74) *Attorney, Agent, or Firm* — Fujitsu Patent Center

(57) ABSTRACT

In a wind noise suppressor, a divider divides the frequency band an input sound into a first frequency band having a possibility that wind noise is included and a second frequency band having a frequency higher than a frequency of the first frequency band, a calculator calculates a probability that the input sound includes wind noise from feature parameters of a sound in the first frequency band, a suppressor suppresses wind noise included in the first frequency band in accordance with an intensity calculated from the probability, and an adder mixes and outputs the sound in the second frequency band divided by the divider and the sound in the first frequency band by which wind noise is suppressed by the suppressor.

6 Claims, 19 Drawing Sheets

WIND NOISE SUPPRESSOR, SEMICONDUCTOR INTEGRATED CIRCUIT, AND WIND NOISE SUPPRESSION METHOD

CROSS-REFERENCE TO RELATED APPLICATION

This application is based upon and claims the benefit of priority of the prior Japanese Patent Application No. 2011-106394, filed on May 11, 2011, the entire contents of which are incorporated herein by reference.

FIELD

The embodiments discussed herein relate to a wind noise suppressor, a semiconductor integrated circuit, and a wind noise suppression method.

BACKGROUND

It is possible for a recent digital camera to take a movie also, but, although high image quality is realized, wind noise is likely to mix into a sound at the time of video taking. It is possible to attach a wind-shielding sponge or the like to a video camera etc. capable of mounting an external microphone, but, many digital cameras record sound with an internal microphone. Hence, a technique to suppress wind noise by signal processing is used conventionally.

Wind noise tends to concentrate in a low-frequency band and there is a known technique to suppress the region with a high-pass filter.

Further, a technique to divide an input signal into bands and to detect wind noise from the autocorrelation between the bands is also known. In this technique, by reducing an input signal on the low-frequency band side where wind noise is dominant more than an input signal on the high-frequency band side, the audio signal included mostly on the high-frequency band side is prevented from being lost.

Furthermore, there used to be a technique to detect a wind noise component from a difference or a correlation value between 2-channel signals by utilizing the fact that the wind noise has little correlation between channels, in the 2-channel signals recorded with two microphones. For example, the following literature describes such conventional techniques:

Japanese Laid-Open Patent Publication No. 2001-352594

Japanese Patent No. 3186892

Japanese Laid-Open Patent Publication No. 2009-55583

There is a case where an audio signal, not noise, is included also on the low-frequency band side in which wind noise is included, and therefore, it used to be difficult to suppress wind noise without losing the naturalness of sound.

SUMMARY

According to an aspect of the invention, a wind noise suppressor is provided, which has a divider that divides a frequency band of an input sound into a first frequency band having a possibility that wind noise is included and a second frequency band having a frequency higher than a frequency of the first frequency band, a calculator that calculates a probability that the input sound includes wind noise from feature parameters of a sound in the first frequency band, a suppressor that suppresses wind noise included in the first frequency band in accordance with an intensity calculated from the probability, and an adder that mixes and outputs the sound in the second frequency band divided by the divider and the sound in the first frequency band by which wind noise is suppressed by the suppressor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
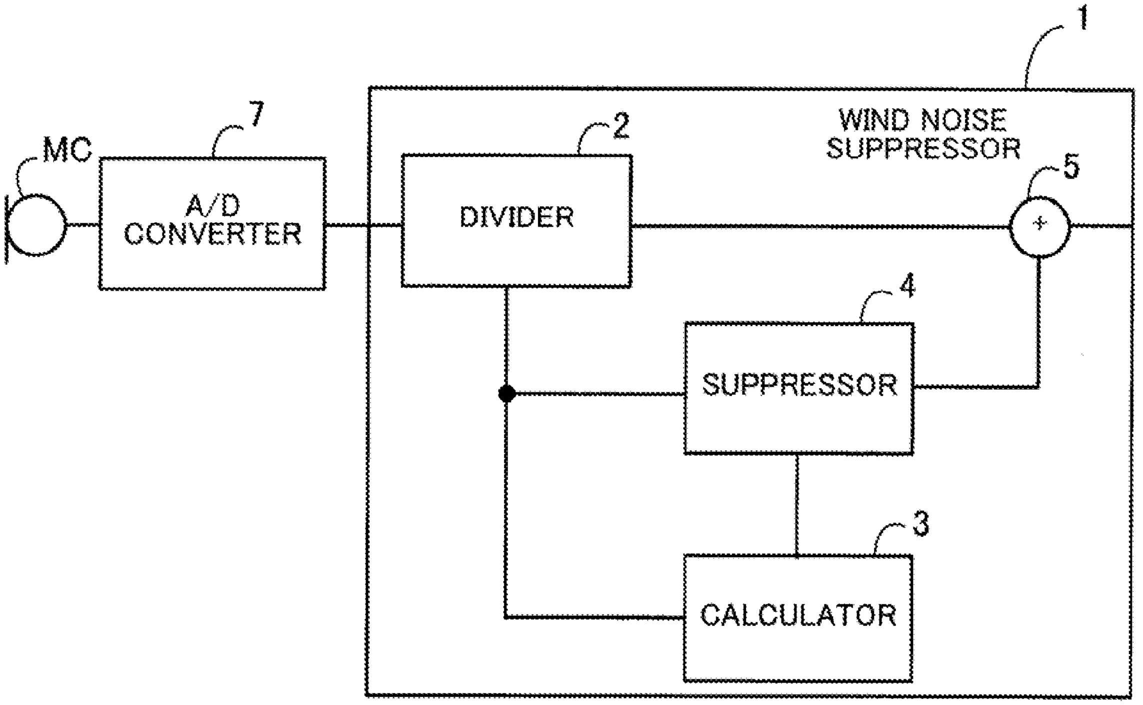
FIG. 1 illustrates an example of a wind noise suppressor of a first embodiment.

Several embodiments will be described below with reference to the accompanying drawings, wherein like reference numerals refer to like elements throughout.

First Embodiment

FIG. 1 illustrates an example of a wind noise suppressor of a first embodiment.

A wind noise suppressor 1 is mounted on, for example, an LSI (Large Scale Integrated circuit) for video processing and has a divider 2, a calculator 3, a suppressor 4, and an adder 5.

The divider 2 divides an input monaural sound picked up by a microphone MC and converted into a digital signal by an A/D (Analog/Digital) converter 7 into a frequency band having a possibility that wind noise is included and a frequency band having a frequency higher than a frequency of the former frequency band. In the following explanation, the frequency band on the side of lower frequencies divided by the divider 2 is referred to as a low band and the frequency band on the side of higher frequencies as a high band.

Wind noise tends to concentrate in a frequency band of 500 Hz or lower (in particular, a band with a frequency of 200 to 300 Hz as a center). Hence, the divider 2 divides the frequency band of an input sound into the low band having a possibility of including wind noise and the high band having a small possibility of including wind noise at about, for example, 1,000 Hz as a boundary.

The calculator 3 calculates a probability that the input sound includes wind noise (hereinafter, referred to as a probability of wind noise) from the feature parameters of a sound in the low band. The feature parameters include an amount of variation in magnitude of the input sound (hereinafter, referred to as an intensity in some cases), a period of variation in magnitude of input sound (variation rate), a first-order autocorrelation coefficient, etc. A method for calculating the probability of wind noise will be described later.

The suppressor 4 suppresses the magnitude of a sound in the low band with an intensity in accordance with the probability of wind noise calculated by the calculator 3.

The adder 5 mixes and outputs the sound in the low band that is suppressed and the sound in the high band divided by the divider 2.

According to the wind noise suppressor 1 as described above, a probability that an input sound includes wind noise is calculated from feature parameters of the sound in the low band and the wind noise included in the low band is suppressed with an intensity in accordance with the probability of wind noise. For example, the input sound having a high probability of wind noise is suppressed strongly and the input sound having a low probability of wind noise is suppressed slightly. Due to this, it is possible to prevent an audio signal that exists in the low band from being suppressed strongly as the wind noise and to suppress the wind noise so as to obtain a more natural audio signal of quality.

Hereinafter, an example of each part of the wind noise suppressor 1 is explained in detail.

Figure 2:
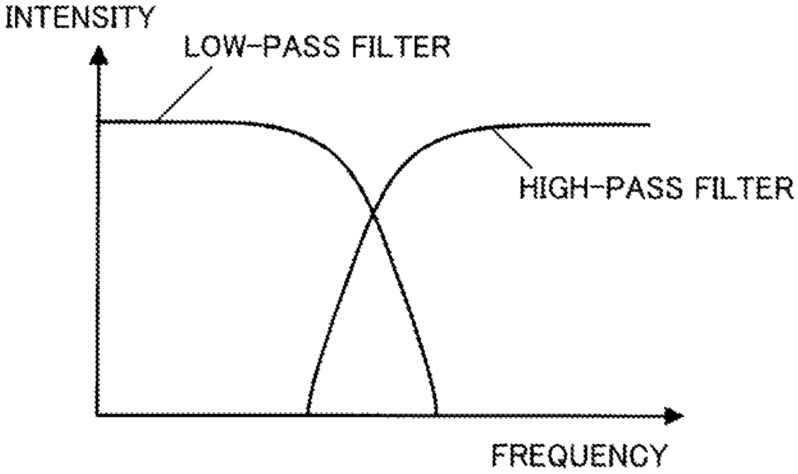
FIG. 2 illustrates an example of frequency characteristics of filter possessed by a divider.

FIG. 2 illustrates an example of a filter possessed by the divider. The horizontal axis represents frequency and the vertical axis, intensity.

The divider 2 has a low-pass filter and a high-pass filter exhibiting the frequency characteristics as illustrated in FIG. 2. The frequency at the intersection of the characteristics of the low-pass filter and the high-pass filter is about, for example, 1,000 Hz. The output of the low-pass filter is input to the calculator 3 and the suppressor 4 and the output of the high-pass filter is input to the adder 5.

In the example illustrated in FIG. 2, the frequency characteristics of the low-pass filter and those of the high-pass filter overlap each other, and therefore, there is an overlap of the low band and the high band obtained through the dividing, however, it may also be possible to divide without any overlap by adjusting each filter.

Figure 3:
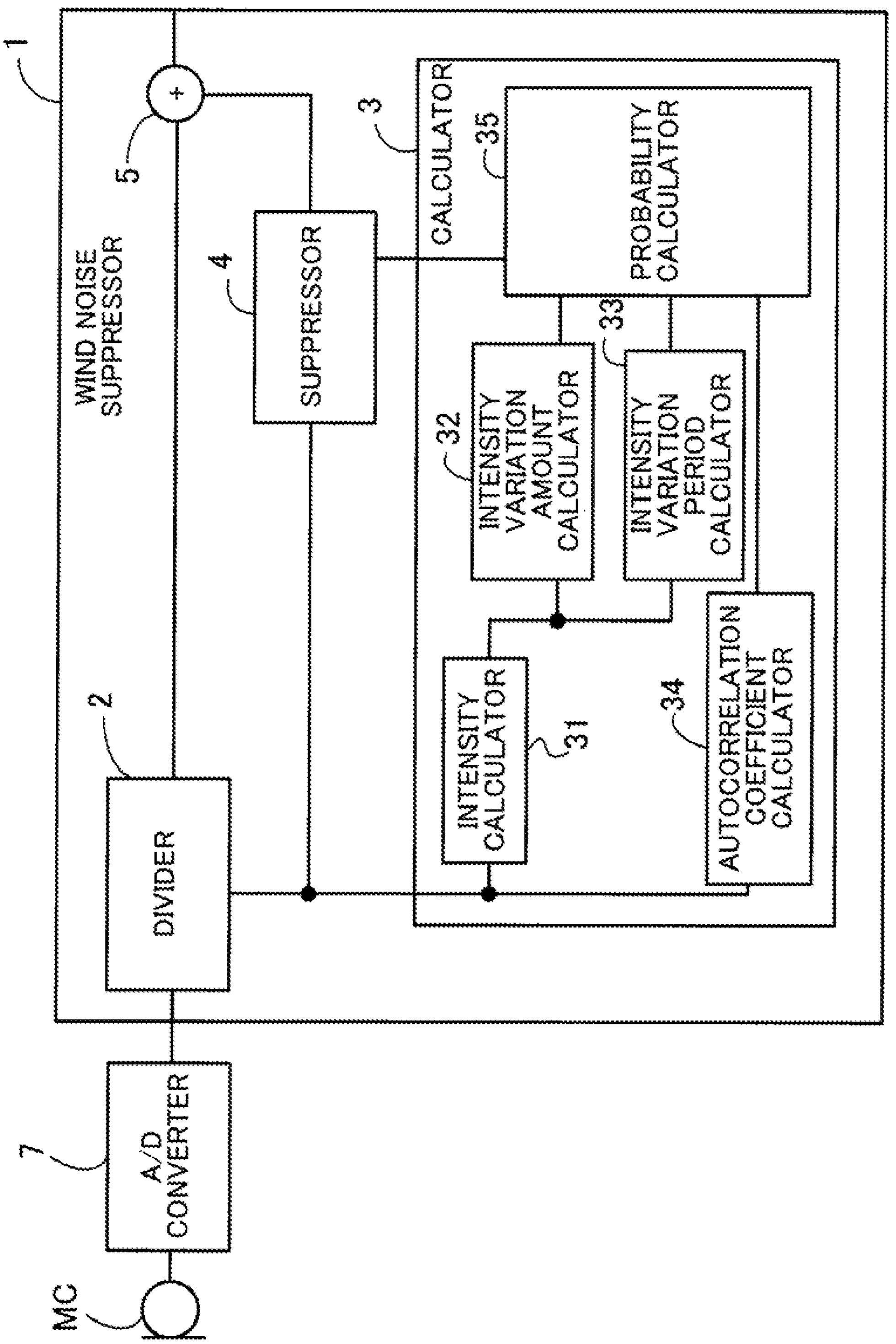
FIG. 3 illustrates an example of a calculator.

FIG. 3 illustrates an example of the calculator.

The calculator 3 has an intensity calculator 31, an intensity variation amount calculator 32, an intensity variation period calculator 33, an autocorrelation coefficient calculator 34, and a probability calculator 35.

Figure 4:
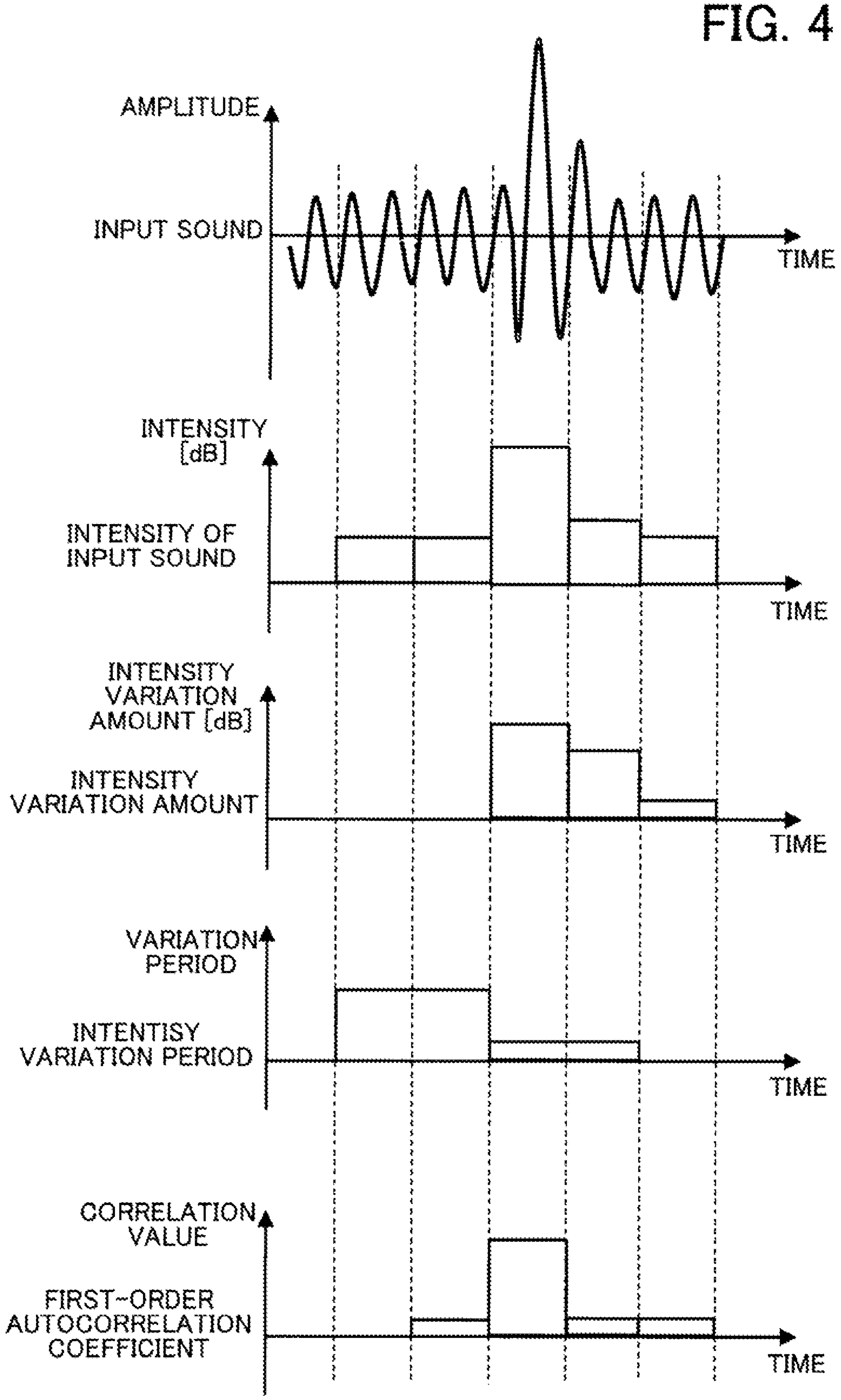
FIG. 4 illustrates an example of an input sound to a calculator, an intensity of an input sound, an amount of variation in intensity, a period of variation in intensity, and a first-order autocorrelation coefficient.

FIG. 4 illustrates an example of an input sound to the calculator and the intensity, the intensity variation amount, the intensity variation period, and the first-order autocorrelation coefficient of the input sound, respectively.

In each graph of FIG. 4, the horizontal axis represents time. The vertical axis represents the amplitude in the graph of the input sound, the intensity (dB) in the graph of the input sound, the intensity variation amount (dB) in the graph of the intensity variation amount, the variation period in the graph of the intensity variation period, and the correlation value in the graph of the first-order autocorrelation coefficient. The time between dotted lines represents a time frame (hereinafter, simply referred to as a frame) that is a unit time during which processing is performed.

The intensity calculator 31 calculates the intensity of the input sound in the low band based on the mean square of the amplitude of the input sound for each frame. If it is assumed that the input sound of a certain frame is x (i) ($0 \le i < T$) (T is the frame period), an intensity fp (dB) of the frame is calculated by, for example, Expression (1) below.

$$fp = 10\log_{10}\left(\frac{1}{T}\sum_{i=0}^{T-1} x(i)^2\right) \quad (1)$$

By the above, the intensity of the input sound as illustrated in the second graph from the top of FIG. 4 is obtained.

The intensity variation amount calculator 32 calculates a difference between the intensity of the input sound of a certain frame and the intensity of the input sound of the previous frame as an intensity variation amount. If it is assumed that the intensity of the input sound of a frame with a frame number t is fp (t) and the intensity of the input sound of the previous frame is fp (t−1), then, an intensity variation amount dfp is calculated by Expression (2) below.

$$dfp(t) = |fp(t) - fp(t-1)| \quad (2)$$

By the above, the intensity variation amount as illustrated in the third graph from the top of FIG. 4 is obtained.

The intensity variation period calculator 33 calculates the period of intensity variation. As the period of intensity variation, a period with which the autocorrelation coefficient of the intensity of the frame is at its maximum is used. If it is assumed that the intensity of a frame with the frame number t is fp (t), a period pfp of intensity variation is calculated by, for example, Expressions (3) and (4) below.

$$autocorr(\tau) = \sum_{t=\tau}^{K} fp(t-\tau) \cdot fp(t) \quad (3)$$

$$pfp = \text{argmax}(autocorr(\tau)) \quad (4)$$

In Expression (3), autocorr (τ) is a coefficient representing an autocorrelation with the intensity variation when shifted by τ frames. K is the number of frames in an interval for which the period of intensity variation is to be found. In Expression (4), arg max (autocorr (τ)) is a function to find τ with which autocorr (τ) is at its maximum.

By Expressions (3) and (4) as described above, the period of intensity variation as illustrated in the second graph from the bottom of FIG. 4 is obtained.

The autocorrelation coefficient calculator 34 calculates the first-order autocorrelation coefficient representing an outline (gradient) of the frequency spectrum of the input sound in the low band. If it is assumed that the input sound of a frame is x (i) (0≤i<T) (T is the frame period), a first-order autocorrelation coefficient $ac_1$ is calculated by, for example, Expression (5) or Expression (6) below.

$$ac_1 = \sum_{i=1}^{T} x(i-1) \cdot x(i) \tag{5}$$

$$ac_1 = \left\{ \sum_{i=1}^{T} x(i-1) \cdot x(i) \right\} \Big/ \left\{ \sum_{i=1}^{T} x(i)^2 \right\} \tag{6}$$

By the above, the first-order autocorrelation coefficient (correlation value) as illustrated in the lowermost graph of FIG. 4 is obtained.

The probability calculator 35 finds each probability of being wind noise from the intensity variation amount, the intensity variation period, and the first-order autocorrelation coefficient that are calculated and integrates the probabilities.

In the following, an example of a method for calculating a probability of wind noise by the intensity variation amount, the intensity variation period, and the first-order autocorrelation coefficient, respectively, is explained. In the following explanation, it is assumed that the probability calculator 35 finds the probability of wind noise as a probability value from 0 to 1.0.

(Method for Calculating Probability of Wind Noise by Intensity Variation Amount)

The wind noise is characterized by having a very large intensity variation amount, and therefore, when the intensity variation amount is not less than a certain level, the probability calculator 35 calculates the probability value of the probability of wind noise as a value exceeding zero and when the intensity variation amount exceeds a further larger value, the probability calculator 35 determines that it is wind noise without doubt and calculates a probability value of 1.0.

If it is assumed that a threshold value of the intensity variation amount dfp by which the probability of wind noise is determined to be greater than zero is $Th_{dfp1}$ and the threshold value of the intensity variation amount dfp by which it is determined to be wind noise without doubt is $Th_{dfp2}$, a probability value p1 of the probability of wind noise by the intensity variation amount is found by, for example, Expression (7) below $$p1 = 0.0 \text{ when } dfp < Th_{dfp1}$$

$$p1 = 1.0 \text{ when } dfp > Th_{dfp2} \text{ and}$$

$$p1 = (dfp - Th_{dfp1})/(Th_{dfp2} - Th_{dfp1}) \text{ in other cases} \tag{7}$$

(Method for Calculating Probability of Wind Noise by Intensity Variation Period)

Wind noise has a specific variation period (speed of variation). Because of this, the probability calculator 35 finds a probability value of the probability being wind noise from a difference between the calculated intensity variation period and a typical value of the variation period of wind noise.

If it is assumed that a typical value of the variation period of wind noise is $T_W$ and a threshold value of the difference value by which the probability of wind noise is determined to be greater than zero is $Th_{TW}$, a probability value p2 of the probability of wind noise by the intensity variation period pfp is found by, for example, Expression (8) below $$p2 = 1.0 - |pfp - T_W|/Th_{TW} \text{ when } |pfp - T_W| \le Th_{TW} \text{ and}$$

$$p2 = 0.0 \text{ in other cases} \tag{8}$$

(Method for Calculating Probability of Wind Noise by First-Order Autocorrelation Coefficient)

Wind noise has a very low frequency component, and therefore, in the wind noise interval, the first-order autocorrelation coefficient takes a large value. It is possible to regard the first-order autocorrelation coefficient as a value that represents the magnitude of the low band compared with the high band.

If it is assumed that a threshold value of the first-order autocorrelation coefficient by which the probability of wind noise is determined to be greater than zero is $Th_{ac1}$, a probability value p3 of the probability of wind noise by the first-order autocorrelation coefficient ac1 is found by, for example, Expression (9) below $$\text{when } 1.0 < ac1, p3 = 1.0$$

$$\text{when } Th_{ac1} \le ac1 \le 1.0, p3 = (ac1 - Th_{ac1})/(1.0 - Th_{ac1}) \text{ and}$$

$$\text{when } ac1 < Th_{ac1}, p3 = 0.0 \tag{9}$$

(Integration Method)

The probability calculator 35 adds weight values wp1, wp2, and wp3 to the probability values p1, p2, and p3, respectively, calculated by the above-mentioned Expressions (7) to (9) and integrates these values as Expression (10) below and outputs a probability value p of the final probability of wind noise. Here, it is assumed that 0≤wp1≤1.0, 0≤wp2≤1.0, and 0≤wp3≤1.0.

$$p = (wp1 \cdot p1 + wp2 \cdot p2 + wp3 \cdot p3)$$

$$\text{when } p > 1.0, \text{ it is assumed that } p = 1.0 \tag{10}$$

It may also be possible to calculate the probability value p of the probability of wind noise from one or two values without using all the probability values p1 to p3.

Next, an example of the suppressor 4 illustrated in FIG. 1 is illustrated.

Figure 5:
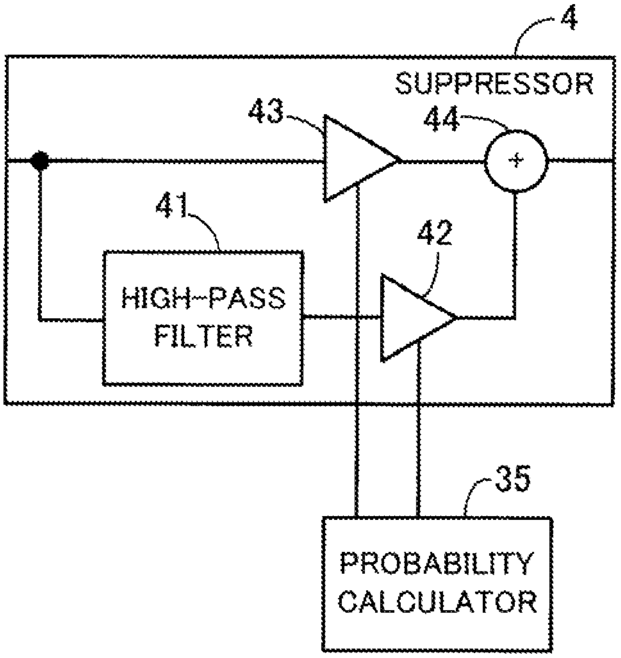
FIG. 5 illustrates an example of a suppressor.

FIG. 5 illustrates an example of the suppressor.

The suppressor 4 has a high-pass filter 41, variable gain amplifiers 42 and 43, and an adder 44.

The high-pass filter 41 suppresses, for example, the high-frequency band in which the possibility is strong that wind noise is included of the input sound in the low band divided by the divider 2.

Figure 6:
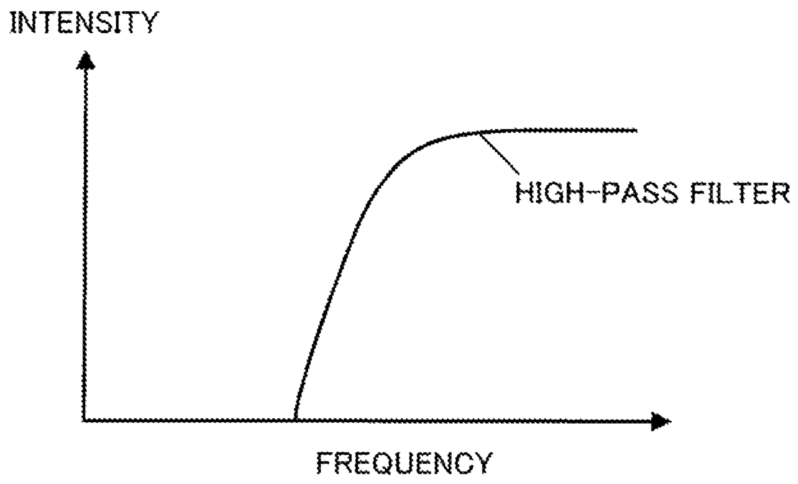
FIG. 6 illustrates an example of frequency characteristics of high-pass filter.

FIG. 6 illustrates an example of the high-pass filter. The horizontal axis represents frequency and the vertical axis, intensity.

The high-pass filter 41 has frequency characteristics to suppress a signal in a frequency band of, for example, about 500 Hz or less, where the possibility is strong that wind noise is included when wind noise occurs.

To the variable gain amplifier 42 illustrated in FIG. 5, the output of the high-pass filter 41 is input and amplification is performed based on the probability value p of the probability of wind noise calculated by the probability calculator 35. To the variable gain amplifier 43, the input sound (input signal to the suppressor 4) in the low band divided by the divider 2 is input and amplification is performed based on the value, which is one minus the probability value p.

If it is assumed that an input signal of the suppressor 4 at a certain time is x, the probability value of the probability of wind noise is p (0≤p≤1.0), and the output of the high-pass filter 41 is $x_{hp}$, an output signal y of the suppressor 4 is expressed as Expression (11) below $$y=p\cdot x_{hp}+(1-p)x \quad (11)$$

By the above, the magnitude of the input sound in the low band is suppressed with the intensity in accordance with the probability value of the probability of wind noise calculated by the probability calculator 35.

The operation of the wind noise suppressor of the first embodiment is summarized below.

Figure 7:
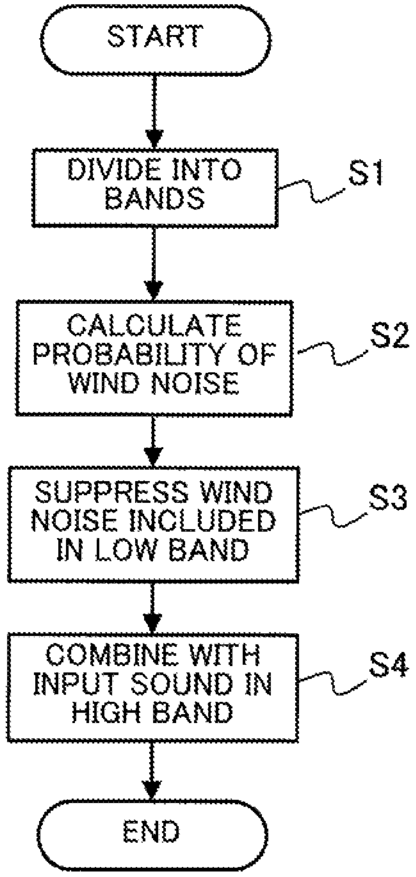
FIG. 7 is a flowchart of a flow of wind noise suppression processing by the wind noise suppressor of the first embodiment.

FIG. 7 is a flowchart of a flow of wind noise suppression processing by the wind noise suppressor of the first embodiment.

Step S1: The divider 2 divides the input sound picked up by a microphone MC and converted into a digital signal by the A/D converter 7 into a low band having a possibility that noise is included and a high band.

Step S2: The calculator 3 calculates the probability of wind noise, for example, in the manner as expressed by Expressions (1) to (10), from the feature parameters of the input sound in the low band obtained through the dividing.

Step S3: The suppressor 4 suppresses the wind noise included in the low band with the intensity in accordance with the probability of wind noise calculated by the calculator 3. For example, as described previously, the wind noise included in the low band is suppressed as illustrated by Expression (11) based on the probability value p of the probability of wind noise calculated by the probability calculator 35 of the calculator 3.

Step S4: The adder 5 mixes and outputs the input sound in the low band in which wind noise is suppressed by the suppressor 4 and the input sound in the high band divided by the divider 2.

According to the wind noise suppression processing as described above, from the feature parameters of the input sound in the low band, the probability that the input sound includes wind noise is calculated and the wind noise included in the low band is suppressed with the intensity in accordance with the probability. Due to this, it is possible to prevent the audio signal present in the low band from being suppressed strongly as the wind noise and to suppress the wind noise so as to obtain a more natural audio signal of high quality.

Further, it is also made possible to find the probability of wind noise with precision by calculating the probability of wind noise based on a plurality of feature parameters of the input sound and it is possible to obtain a still more natural audio signal of quality by suppressing the magnitude of the input sound in the low band by using the probability of wind noise.

Second Embodiment

Figure 8:
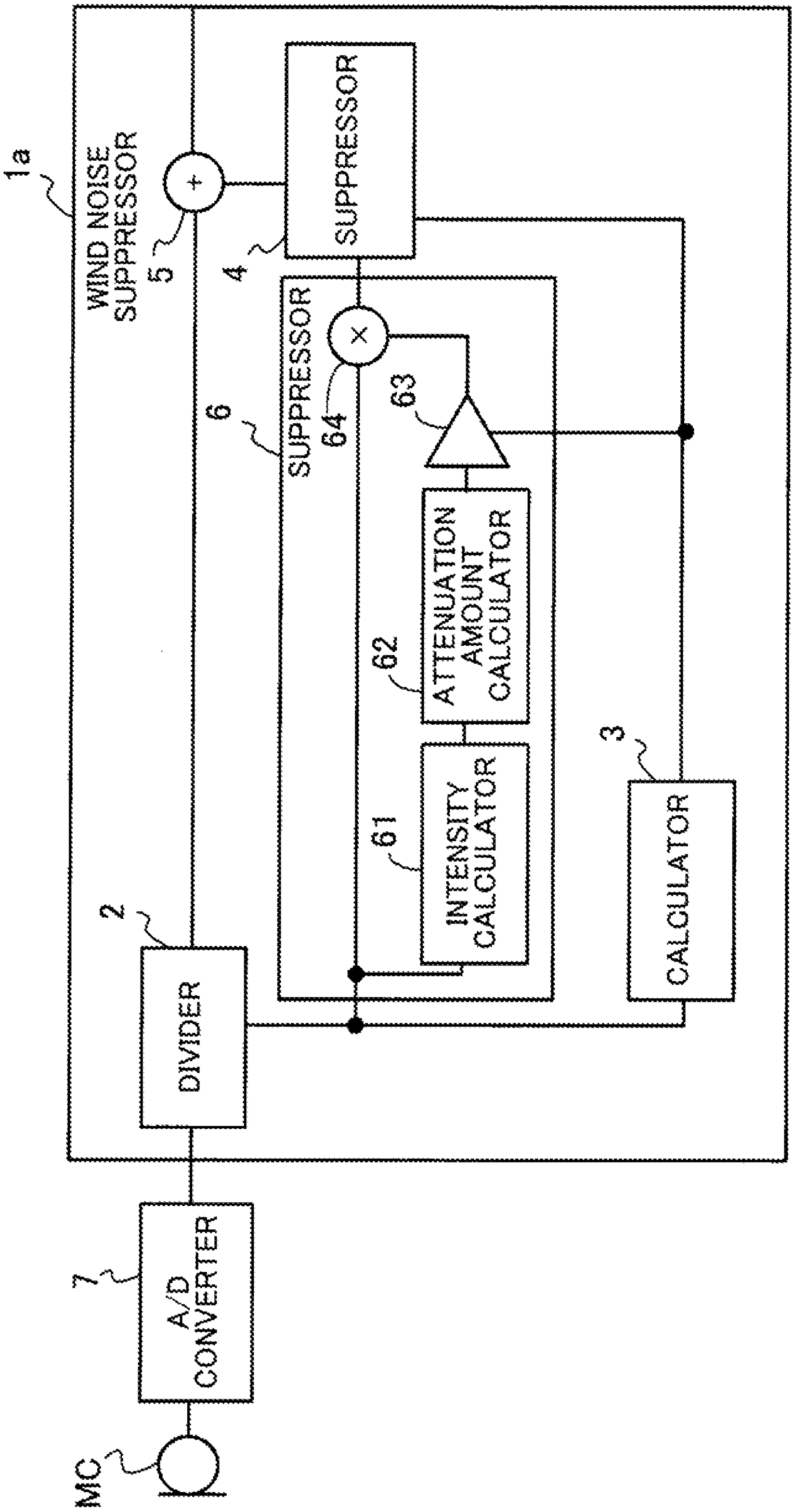
FIG. 8 illustrates an example of a wind noise suppressor of a second embodiment.

FIG. 8 illustrates an example of a wind noise suppressor of a second embodiment.

Like reference numerals are attached to like elements of the wind noise suppressor 1 illustrated in FIG. 1 and their explanation is omitted.

A wind noise suppressor 1*a* of the second embodiment has another suppressor 6. The suppressor 6 performs nonlinear amplitude compression processing to compress (attenuate) an input signal (input sound in the low band divided by the divider 2) having an intensity not less than a threshold value but leave an input signal having a low intensity as it is. The suppressor 6 has an intensity calculator 61, an attenuation amount calculator 62, a variable gain amplifier 63, and a multiplier 64.

The intensity calculator 61 calculates an intensity of an input signal based on the mean square of the amplitude of the input signal. The intensity is calculated by, for example, the previously-described Expression (1).

The attenuation amount calculator 62 calculates an attenuation amount in accordance with the intensity of an input signal.

The variable gain amplifier 63 amplifies the attenuation amount calculated by the attenuation amount calculator 62 based on the probability value p (0≤p≤1) of the probability of wind noise calculated by the calculator 3.

The multiplier 64 multiplies the input signal by the attenuation amount adjusted by the variable gain amplifier 63 and outputs the result to the suppressor 4.

Figure 9:
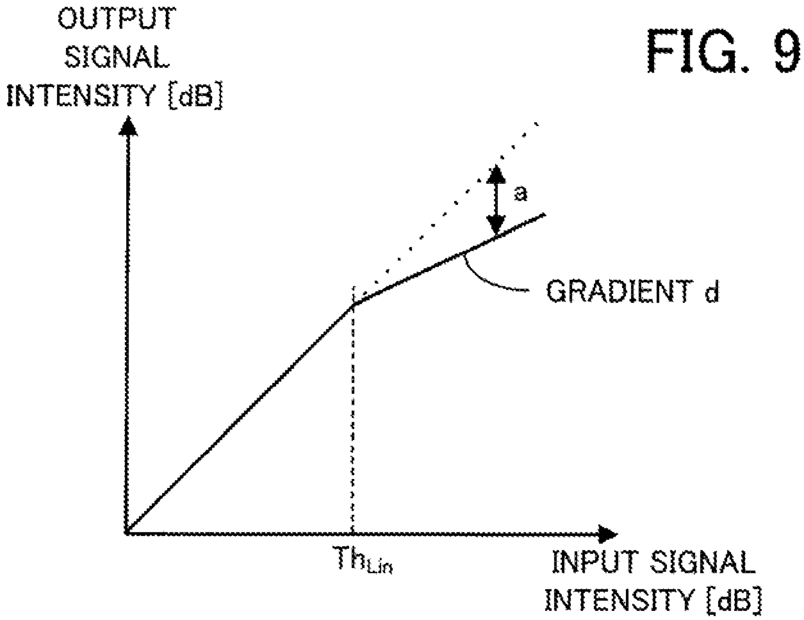
FIG. 9 illustrates a calculation example of an amount of attenuation.

FIG. 9 illustrates a calculation example of an attenuation amount. The horizontal axis represents the intensity (dB) of an input signal of the suppressor 6, the vertical axis represents the intensity (dB) of the output signal of the suppressor 6 when the probability value of the probability of wind noise p=1, and the values of each axis are logarithms, though not illustrated schematically.

The attenuation amount calculator 62 detects the intensity of an input signal and sets an attenuation amount a=0 when the intensity is lower than a threshold value $Th_{Lin}$. At this time, the intensity of the output signal is equal to the intensity of the input signal.

When the intensity of the input signal is not less than the threshold value $Th_{Lin}$, the attenuation amount calculator 62 sets a gradient and calculates the attenuation amount a based on the intensity of the input signal. If it is assumed that the intensity of the input signal is Lin, the intensity of the output signal is Lout, and the gradient is d, the attenuation amount a is calculated by, for example, Expression (12) below $$Lout=Th_{Lin}+d\cdot(Lin-Th_{Lin})$$

$$a=Lin-Lout \quad (12)$$

That is, when the intensity of the input signal is not less than the threshold value $Th_{Lin}$, the intensity of the output signal≤the intensity of the input signal holds and the higher the intensity of the input signal, the larger the attenuation amount a becomes.

The attenuation amount a found in accordance with the intensity of the input signal and the output signal as illustrated in FIG. 9 is converted into a linear value (value that satisfies a linear relationship) and input to the variable gain amplifier 63.

If it is assumed that an input signal to the suppressor 6 at a certain time is x, the attenuation amount calculated by the attenuation amount calculator 62 is a (0≤a≤1.0), and the probability value of the probability of wind noise is p (0≤p≤1.0), an output signal y is calculated by Expression (13) below $$y=p\cdot a\cdot x \quad (13)$$

Figure 10A:
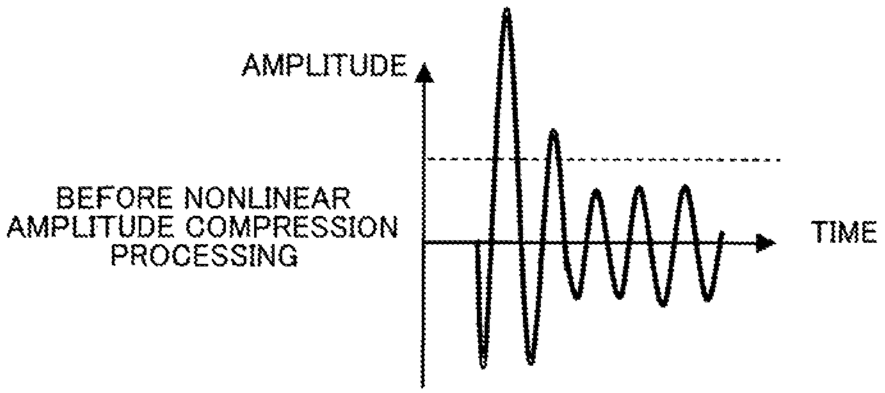
FIGS. 10A and 10B illustrate an example of a signal waveform before and after nonlinear amplitude compression processing.
Figure 10B:
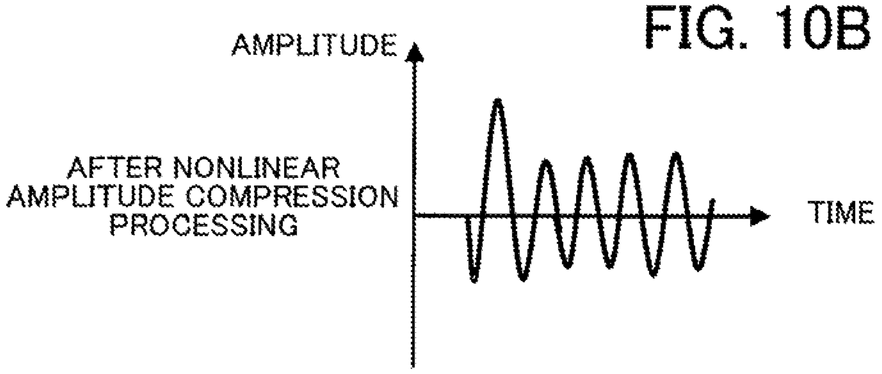

FIGS. 10A and 10B illustrate examples of signal waveforms before and after the nonlinear amplitude compression processing. The horizontal axis represents time and the vertical axis represents amplitude.

FIG. 10A represents the signal waveform of the input signal of the suppressor 6 before the nonlinear amplitude compression processing and FIG. 10B represents the signal waveform of the output signal of the suppressor 6 after the nonlinear amplitude compression processing.

In the signal waveform before the nonlinear amplitude compression processing, the amplitude of the part of the signal not less than a threshold value indicated by a dotted line is compressed (attenuated) by the above-mentioned processing and the signal waveform as illustrated in FIG. 10B is obtained.

The input sound subjected to the processing by the suppressor 6 is further input to the suppressor 4 and subjected to the same processing as that in the wind noise suppressor 1 of the first embodiment.

Figure 11:
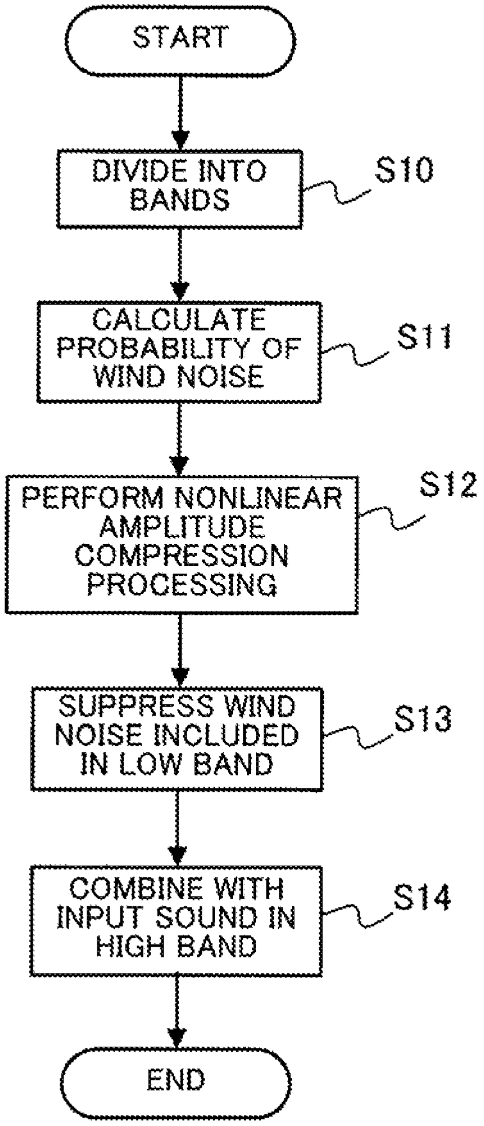
FIG. 11 is a flowchart of a flow of wind noise suppression processing by the wind noise suppressor of the second embodiment.

FIG. 11 is a flowchart of a flow of wind noise suppression processing by the wind noise suppressor of the second embodiment.

The processing at steps S10 and S11 is the same as the processing at steps S1 and S2 illustrated in FIG. 7.

Step S12: The suppressor 6 performs the above-mentioned nonlinear amplitude compression processing on the input sound in the low band divided by the divider 2. That is, the suppressor 6 suppresses the magnitude of an input sound having a predetermined magnitude or more with intensity in accordance with the attenuation amount and the probability of wind noise.

Step S13: The suppressor 4 suppresses the magnitude of the output signal of the suppressor 6 with intensity in accordance with the probability of wind noise calculated by the calculator 3. For example, as described previously, the suppressor 4 suppresses the magnitude of the output signal of the suppressor 6 in the manner expressed by Expression (11) based on the probability value p of the probability of wind noise calculated by the probability calculator 35 of the calculator 3.

Step S14: The adder 5 mixes and outputs the output signal of the suppressor 4 (the input sound in the low band that is suppressed) and the input sound in the high band divided by the divider 2.

According to the wind noise suppressor 1*a* of the second embodiment, the same effect as that of the wind noise suppressor 1 of the first embodiment described previously is achieved and at the same time, the following effect is also achieved.

Because the amplitude varies considerably in the wind noise interval, it is possible to suppress the wind noise more effectively by the suppressor 6 performing the above-mentioned nonlinear amplitude compression processing. Further, by changing the intensity with which to suppress the wind noise in accordance with the probability of wind noise, it is possible to suppress the wind noise so as to obtain a more natural audio signal of quality.

It may also be possible to exchange the positions of the suppressor 6 and the suppressor 4 and to cause the suppressor 6 to perform the above-mentioned nonlinear amplitude compression processing on the input sound suppressed by the suppressor 4.

Third Embodiment

Figure 12:
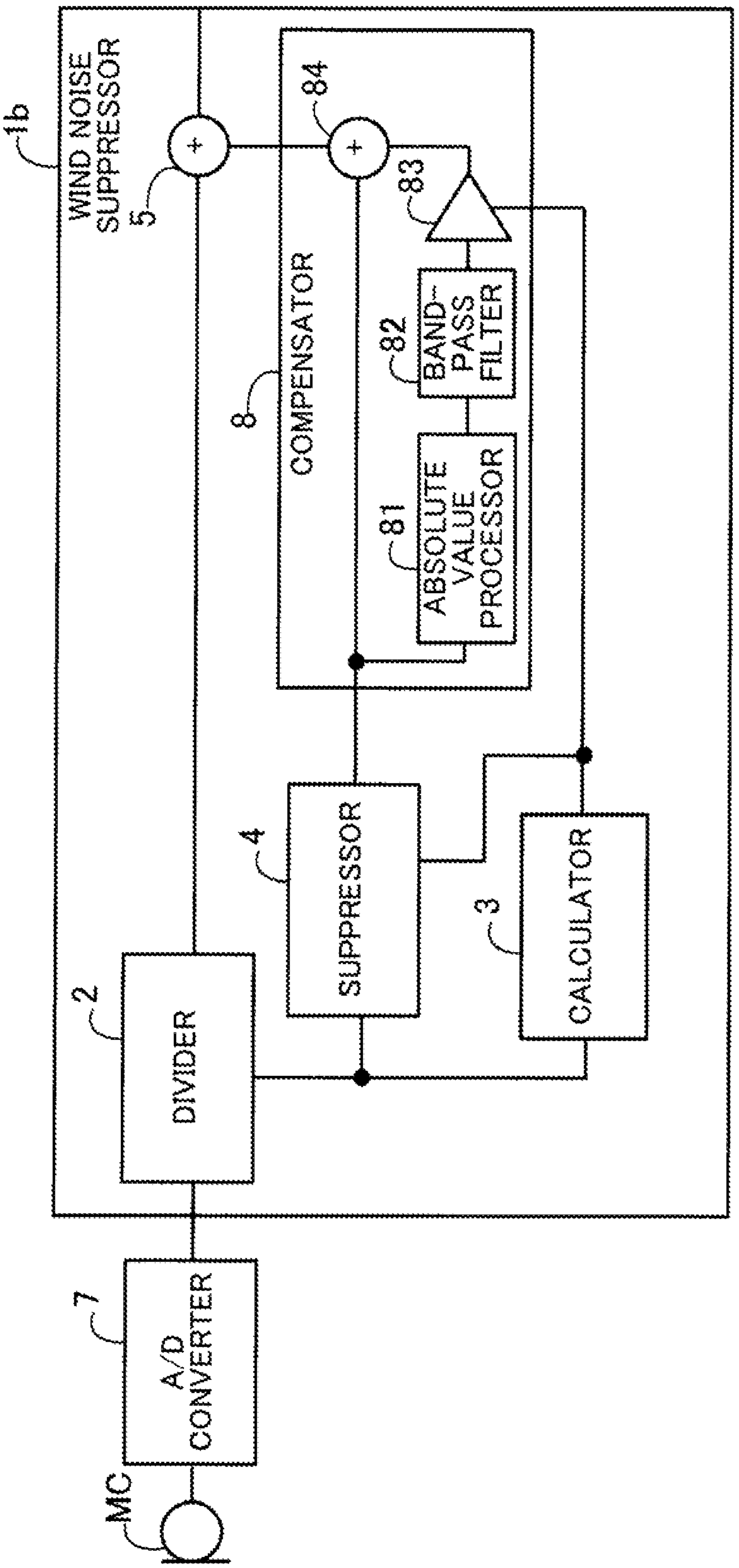
FIG. 12 illustrates an example of a wind noise suppressor of a third embodiment.

FIG. 12 illustrates an example of a wind noise suppressor of a third embodiment.

Like reference numerals are attached to like elements of the wind noise suppressor 1 illustrated in FIG. 1 and their explanation is omitted.

A wind noise suppressor 1*b* of the third embodiment further has a compensator 8. The compensator 8 generates a signal having a low-frequency component in the low band (frequency band suppressed or removed by the high-pass filter 41 of the suppressor 4) in a pseudo-manner from the input sound in the low band in which wind noise is suppressed by the suppressor 4. Then, the compensator 8 performs compensation by adding the signal having the low-frequency component to the input sound in the low band in which wind noise is suppressed by the suppressor 4 with intensity in accordance with the probability of wind noise.

The compensator 8 has an absolute value processor 8, a band-pass filter 82, a variable gain amplifier 83, and an adder 84.

The absolute value processor 81 converts the time waveform of the input sound in the low band in which wind noise is suppressed by the suppressor 4 into an absolute value waveform and outputs the waveform.

The band-pass filter 82 has the functions of a high-pass filter and a low-pass filter and removes the direct current component from the output signal of the absolute value processor 81 by a high-pass filter and allows the low-frequency component of the frequency band of the output signal to pass through a low-pass filter. The frequency characteristics of the low-pass filter are set in accordance with the frequency characteristics of the high-pass filter of the suppressor 4. For example, when the high-pass filter 41 of the suppressor 4 has the frequency characteristics that suppress or remove the signal in the frequency band of about 300 to 500 Hz or less, in the low-pass filter, the frequency characteristics are set so as to allow the signal in such a frequency band to pass.

The variable gain amplifier 83 amplifies the output signal of the band-pass filter 82 based on the probability value p ($0 \leq S \leq 1$) of the probability of wind noise calculated by the calculator 3. For example, the variable gain amplifier 83 outputs a signal that is the output signal of the band-pass filter 82 multiplied by the probability value p.

The adder 84 adds the output signal of the variable gain amplifier 83 to the input signal of the compensator 8.

FIGS. 13A to 13F illustrate an example of processing in the compensator.

Figure 13A:
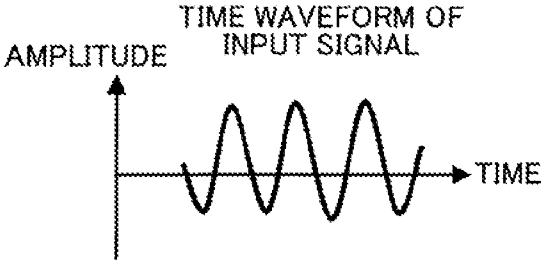
FIGS. 13A to 13F illustrate an example of how processing is performed in a compensator.
Figure 13B:
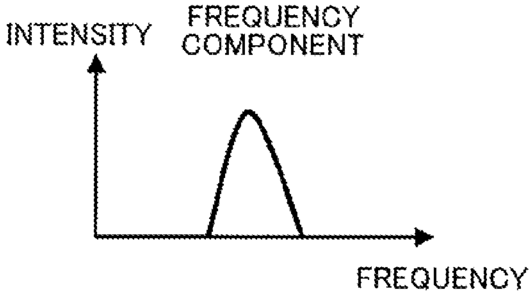
Figure 13C:
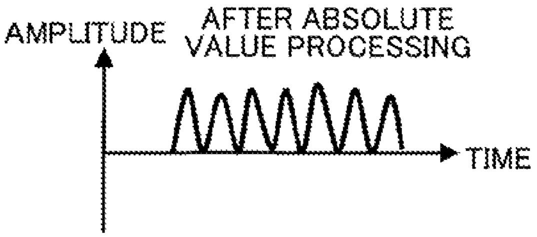
Figure 13D:
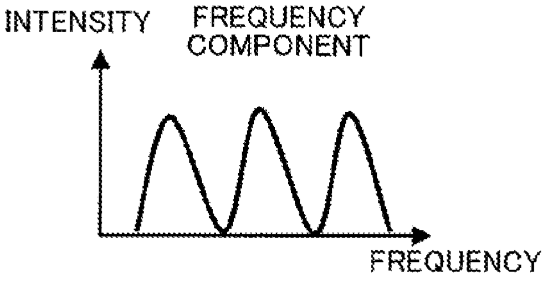
Figure 13E:
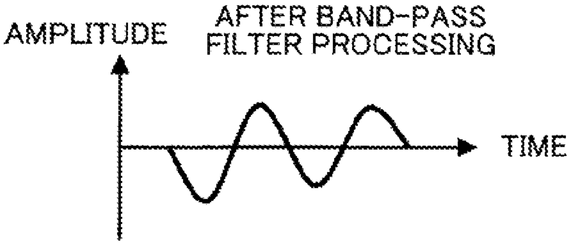

The graphs of FIGS. 13A, 13C and 13E indicate, from top to bottom, the time waveform of the input signal of the compensator 8 (that is, the input sound in the low band suppressed by the suppressor 4), the time waveform after absolute value processing, and the time waveform after band-pass filter processing, wherein the horizontal axis represents time and the vertical axis, amplitude. On the right side of each time waveform, an example of each frequency component is illustrated. In the graph of the frequency component, the horizontal axis represents frequency and the vertical axis, intensity.

In the input signal of the compensator 8, the low-frequency component is suppressed or removed by the processing in the suppressor 4. By the absolute value processor 81 converting the time waveform of the input signal into, for example, the absolute value waveform of the graph in FIG. 13C, the frequency component of a frequency half the frequency of the original frequency component appears as well as the frequency component of a frequency twice the frequency of the original frequency component as illustrated in FIG. 13D.

Figure 13F:
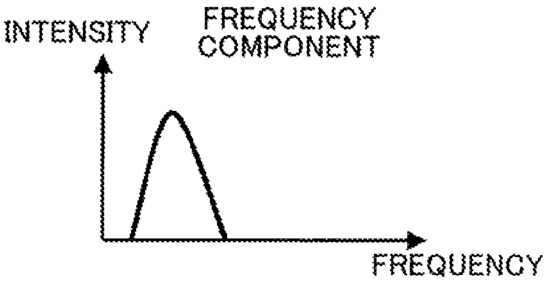

Further, by the band-pass filter 82 removing the direct-current component from the output signal of the absolute value processor 81 and removing the frequency component of the higher frequency while leaving the frequency component of the frequency half the frequency of the original frequency component, the time waveform as illustrated in FIG. 13E and the frequency component as illustrate in FIG. 13F are generated.

When the signal that is the output signal of the band-pass filter 82 having the low-frequency component as in FIG. 13F and multiplied by the probability value p in the variable gain amplifier 83 is output, the signal is added to the input signal of the compensator 8 in the adder 84.

Figure 14:
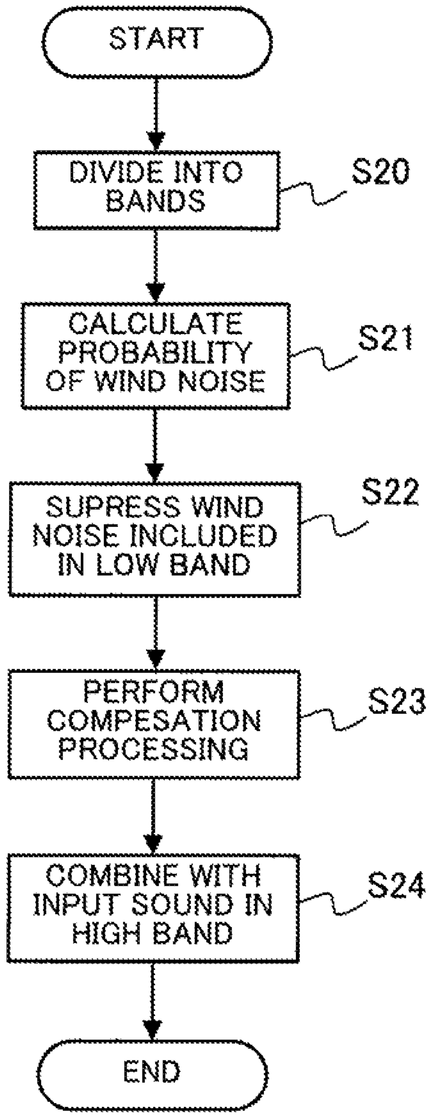
FIG. 14 is a flowchart of a flow of wind noise suppression processing by the wind noise suppressor of the third embodiment.

FIG. 14 is a flowchart of a flow of wind noise suppression processing by the wind noise suppressor of the third embodiment.

Processing at steps S20 to S22 is the same as the processing at step S1 to S3 illustrated in FIG. 7.

Step S23: The compensator 8 performs the above-mentioned compensation processing on the input sound in the low band in which wind noise is suppressed by the suppressor 4. That is, the compensator 8 generates a signal of the low-frequency component in a pseudo-manner from the input signal of the compensator 8 and adds the signal to the input signal with the magnitude in accordance with the probability of wind noise.

Step S24: The adder 5 mixes and outputs the output signal of the compensator 8 and the input sound in the high band divided by the divider 2.

According to the wind noise suppressor 1*b* of the third embodiment, the same effect as that of the wind noise suppressor 1 of the first embodiment previously described is achieved and at the same time, the following effect is also achieved.

Figure 15A:
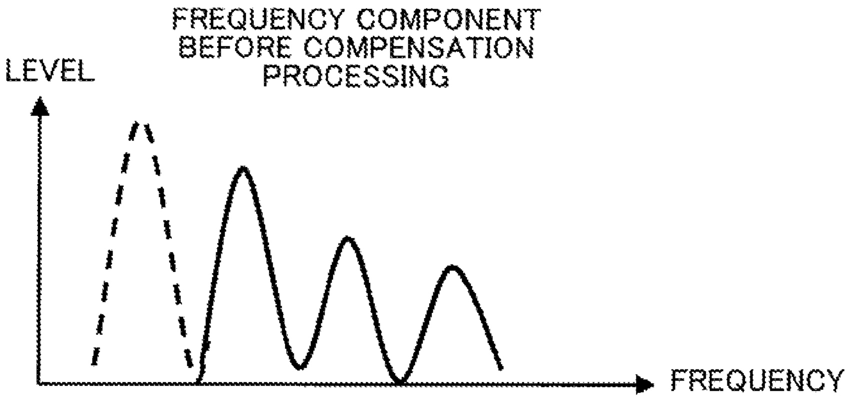
FIGS. 15A and 15B illustrate how a frequency component of a signal changes before and after compensation processing.
Figure 15B:
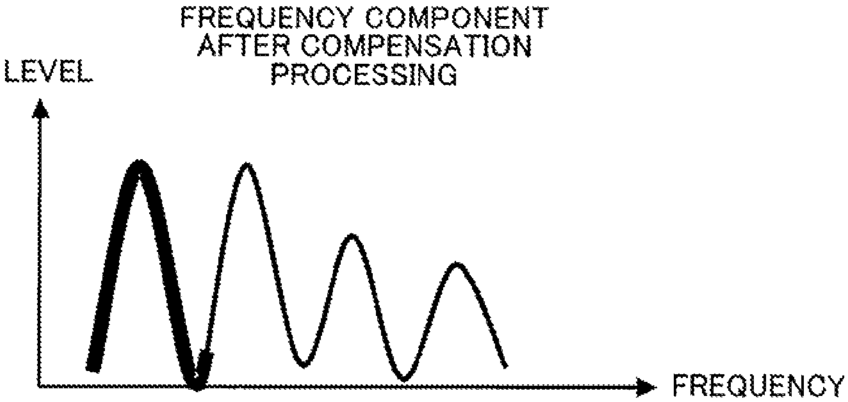

FIGS. 15A and 15B illustrate how a frequency component of a signal changes before and after compensation processing.

As illustrated in FIG. 15A, before compensation processing, even if the low-frequency component (schematically illustrated by a dotted line) is removed by the suppressor 4, the low-frequency component is generated as illustrated in FIG. 15B by performing the above-mentioned compensation processing, and therefore, the frequency component is extended. Due to this, it is possible to turn the sound after wind noise suppression into a more natural sound.

Further, in the suppressor 4, the input sound in the low band is suppressed in accordance with the probability value p of the probability of wind noise, and therefore, it is possible for the variable gain amplifier 83 to perform compensation in accordance with an amount of suppression with which the input sound in the low band is suppressed by using the same probability value p. Due to this, it is possible to turn the sound after wind noise suppression into a still more natural sound.

It may also be possible to provide the suppressor 6 as illustrated in FIG. 8 in the wind noise suppressor 1*b*. Due to this, it is made possible to suppress wind noise so as to obtain a more natural audio signal of quality.

Fourth Embodiment

Figure 16:
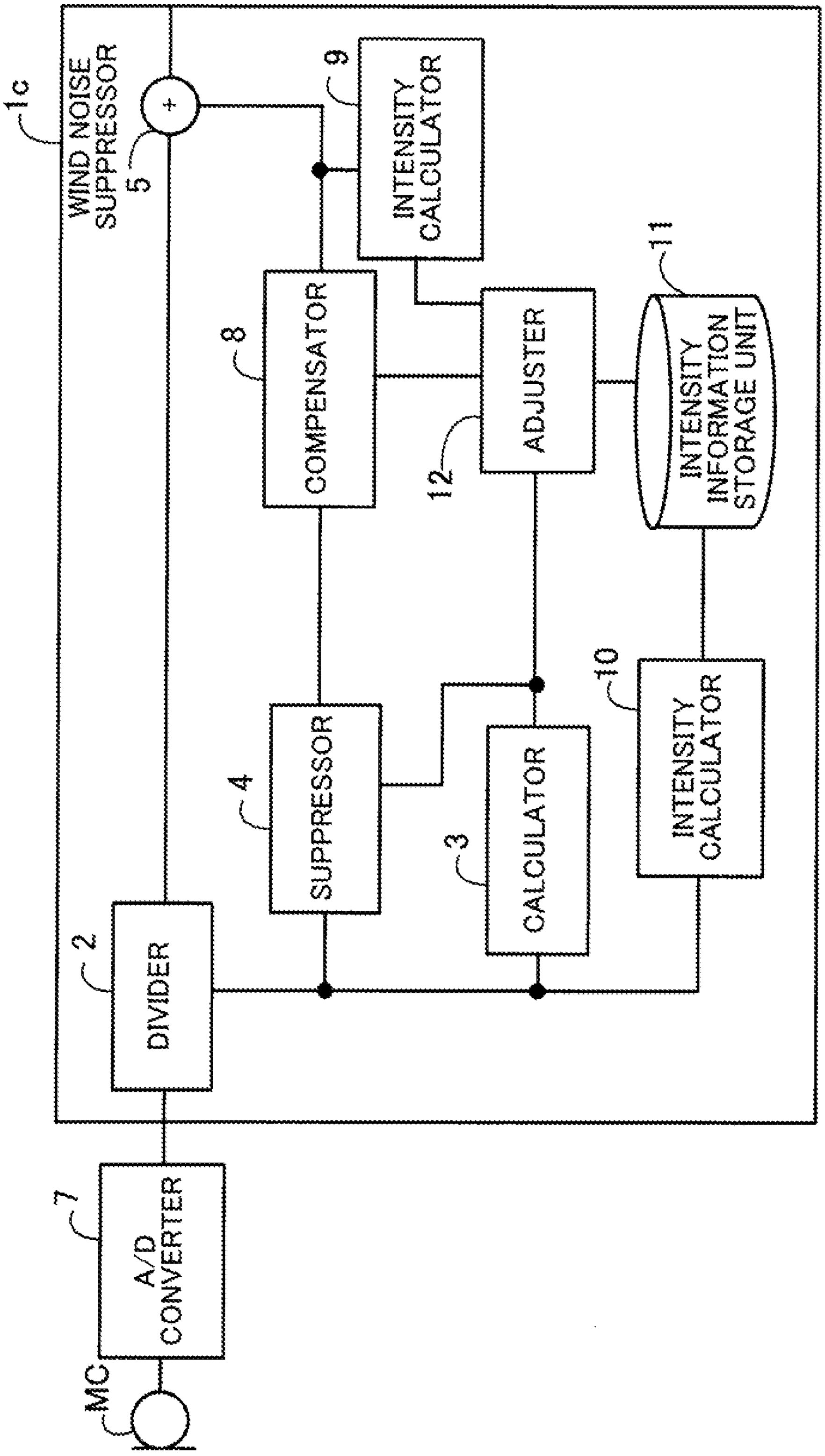
FIG. 16 illustrates an example of a wind noise suppressor of a fourth embodiment.

FIG. 16 illustrates an example of a wind noise suppressor of a fourth embodiment.

Like reference numerals are attached to like elements of the wind noise suppressor 1*b* illustrated in FIG. 12 and their explanation is omitted.

A wind noise suppressor 1*c* of the fourth embodiment has a function to suppress a signal having a low-frequency component to be added by the processing in the compensator 8 previously described from being too small or too large. The wind noise suppressor 1*c* further has intensity calculators 9 and 10, an intensity information storage unit 11, and an adjuster 12 in addition to each element of the wind noise suppressor 1*b* of the third embodiment.

The intensity calculator 9 calculates the intensity of an output signal of the compensator 8. The intensity is calculated by the mean square of the amplitude of the output signal of the compensator 8.

The intensity calculator 10 calculates the intensity of an input sound in the low band divided by the divider 2 by, for example, Expression (1).

The intensity information storage unit 11 stores the value of the intensity of the input sound in the low band for each frame calculated by the intensity calculator 10.

The adjuster 12 adjusts the amount of compensation by the compensator 8 by adjusting the probability of wind noise calculated by the calculator 3 in accordance with the intensity of the output signal of the compensator 8 calculated by the intensity calculator 9 and the intensity of the input sound in the low band stored in the intensity information storage unit 11.

When adjusting the amount of compensation, for example, the adjuster 12 first takes the average of the values of intensity in the past stored in the intensity information storage unit 11 across the plurality of frames to find the average intensity in the past. If the intensity of each frame is taken to be fp (t) and the number of frames for which the average is taken to be $T_B$, an average intensity $fp_{ave}$ of the $T_B$ frames in the past is found by, for example, Expression (14) as below.

$$fp_{ave} = \frac{1}{T_B}\sum_{t=1}^{T_B} fp(t) \tag{14}$$

The adjuster 12 compares the calculated average intensity and the intensity of the output signal of the compensator 8 and adjusts the probability of wind noise when the difference between both intensities is large (when the difference exceeds a threshold value). If the intensity of the output signal of the compensator 8 is taken to be $f_{ex}$, the threshold value to be $Th_{ex}$, and the probability value of the probability of wind noise to be p, the probability value p is adjusted as expressed by, for example, Expression (15) below $$\text{when } fp_{ave}+Th_{ex}<f_{ex},\ p=p-p_{delta} \text{ and}$$

$$\text{when } f_{ex}<fp_{ave}-Th_{ex},\ p=p+p_{delta},$$

$$\text{where } p_{delta} \text{ is an amount of adjustment and } 0<p_{delta}<1.0 \tag{15}$$

When the probability value p is adjusted, the amplification factor of the variable gain amplifier 83 of the compensator 8 illustrated in FIG. 12 changes, the magnitude of the signal in the low-frequency band previously described to be added to the output signal of the suppressor 4 changes, and then, the intensity of the output signal of the compensator 8 changes so as to come close to the side of the average intensity $fp_{ave}$.

Figure 17A:
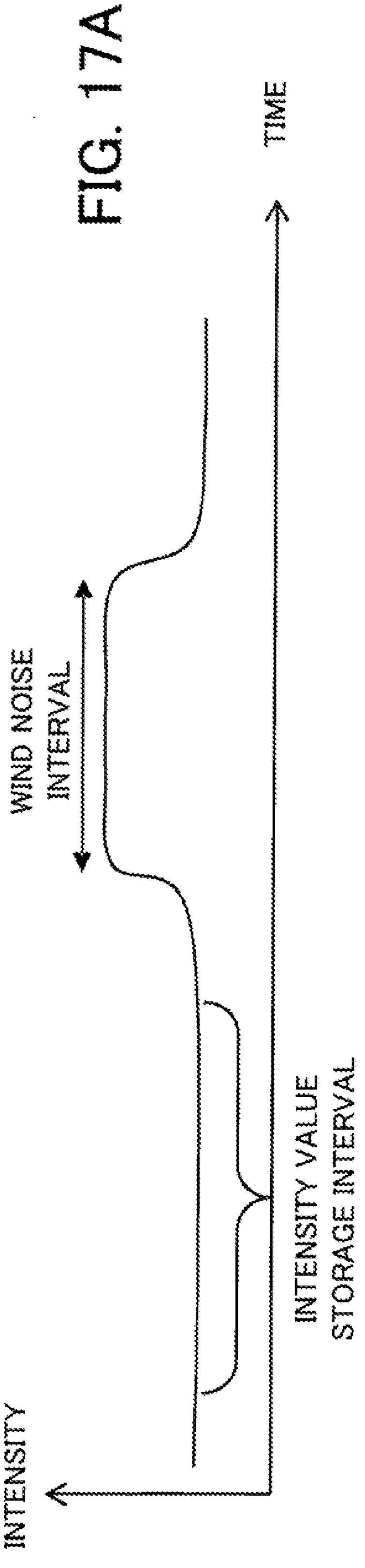
FIGS. 17A to 17C illustrate an example of adjustment of an amount of compensation.
Figure 17B:
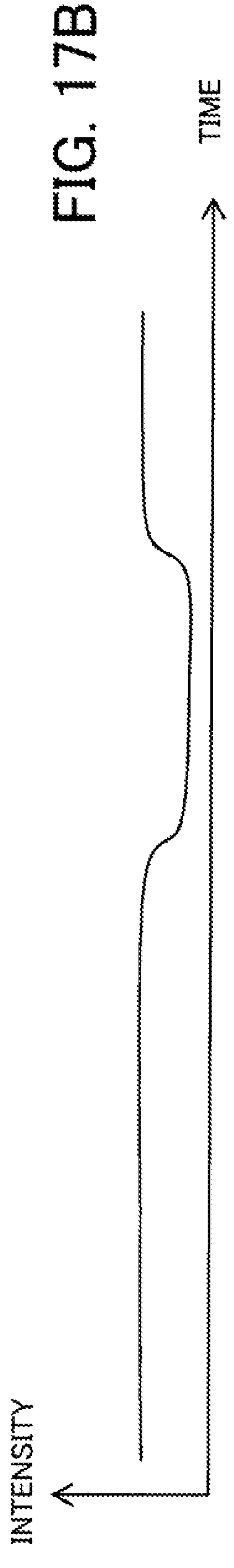
Figure 17C:
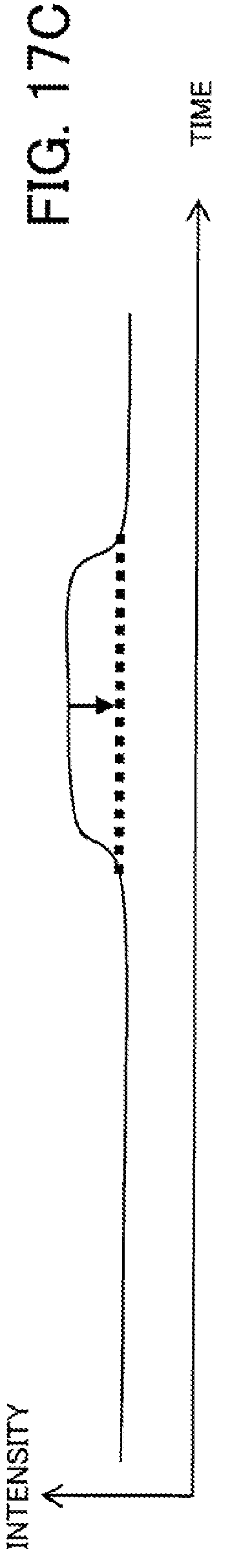

FIGS. 17A to 17C illustrate an example of adjustment of an amount of compensation. From top to bottom, the time waveform of the input sound in the low band divided by the divider 2, the output signal of the suppressor 4, and the output signal from the compensator 8 are illustrated.

For example, the intensity calculator 10 calculates the intensity in a plurality of frames in the interval in which no wind noise occurs in the input sound in the low band divided by the divider 2 and the intensity information storage unit 11 stores the intensity value in each frame in the interval.

When the intensity is reduced too much by the suppressor 4 in the interval in which wind noise occurs as in the waveform in FIG. 17B, it is possible to increase the intensity as in the solid line waveform in FIG. 17C by performing addition of the signal in the low-frequency band by the compensator 8. However, in the example in FIG. 17C, the intensity in the wind noise interval is increased too much compared to the intensity in the interval in which no wind noise occurs. When the intensity at this time is larger than the sum of the average of the intensity in the intensity value storage interval and the threshold value, by the adjustment of the above-mentioned adjuster 12, the intensity is reduced, for example, to the level indicated by the dotted line in FIG. 17C. Due to this, it is possible to put the intensity in the wind noise interval close to the average of the intensity in the intensity value storage interval, and therefore, it is possible to obtain a more natural sound by suppressing the unnaturalness due to shortage or excess of the amount of compensation by the compensator 8.

It may also be possible to provide the suppressor 6 as illustrated in FIG. 8 in the wind noise suppressor 1*c*. If provided, it is made possible to suppress wind noise so as to obtain a more natural audio signal of quality.

Fifth Embodiment

Figure 18:
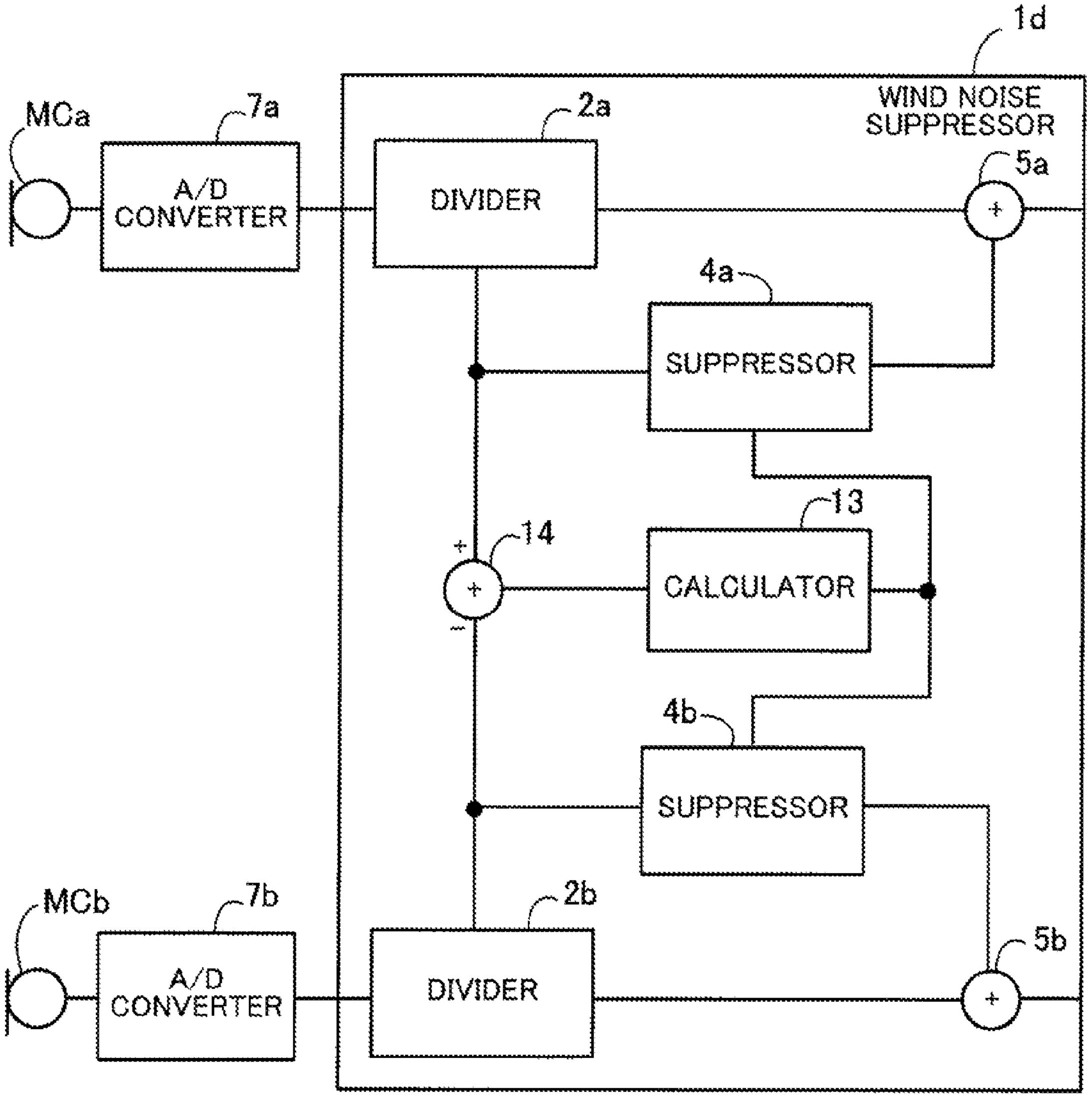
FIG. 18 illustrates an example of a wind noise suppressor of a fifth embodiment.

FIG. 18 illustrates an example of a wind noise suppressor of a fifth embodiment.

A wind noise suppressor 1*d* is configured to suppress wind noise in an input sound of a stereo 2-channel and has microphones MCa and MCb, A/D converters 7*a* and 7*b*, dividers 2*a* and 2*b*, suppressors 4*a* and 4*b*, and adders 5*a* and 5*b* for each channel. Further, the wind noise suppressor 1*d* has an adder 14 that generates a differential signal of input signals in 2-channel low bands divided by the dividers 2*a* and 2*b* and a calculator 13 that calculates the probability of wind noise based on the differential signal.

As in the case of the divider 2 previously described, the dividers 2*a* and 2*b* divide the input sound after A/D conversion into a low band having a possibility that wind noise is included and a high band having a faint possibility that wind noise is included at, for example, 1,000 Hz as a rough boundary.

The adder 14 generates a differential signal of the input sound in the low band obtained through the dividing in each channel. In the example of FIG. 18, the adder 14 generates a differential signal by adding the input sound in the low band divided by the divider 2*b* as a negative signal to the input sound in the low band divided by the divider 2*a*.

The calculator 13 calculates the probability value p of the probability of wind noise by the same technique as that described previously from the feature parameters of the differential signal.

The suppressors 4*a* and 4*b* suppress the magnitude of the input sound in the low band in each channel with an intensity in accordance with the calculated probability value p.

The adders 5*a* and 5*b* mix and output the suppressed input sound in the low band and the input sound in the high band divided by the dividers 2*a* and 2*b*.

Unlike the audio signal, wind noise has a low correlation between channels, and therefore, it is possible to make conspicuous the wind noise component by generating a differential signal. Due to this, the probability of wind noise calculated by the calculator 13 becomes one with higher precision and the magnitude of the input sound in the low band is suppressed with an intensity in accordance with the probability of wind noise, and therefore, it is possible to suppress wind noise so as to obtain a more natural audio signal of quality.

The number of channels may be three or more. In such a case, it is sufficient for the calculator 13 to calculate the probability value p of the probability of wind noise from the feature parameters of the differential signal of the input sounds in the low bands of any two channels of the plurality of channels and to supply the probability value p to the suppressor provided in each channel.

Further, it may also be possible to provide the suppressor 6 as illustrated in FIG. 8 in each channel in the wind noise suppressor 1*d*.

Furthermore, it may also be possible to provide the compensator 8, the adjuster 12, the intensity calculators 9 and 10, and the intensity information storage unit 11 of the wind noise suppressors 1*b* and 1*c* of the third and fourth embodiments in each channel in the wind noise suppressor 1*d*.

The wind noise suppressors 1, 1*a*, 1*b*, 1*c*, and 1*d* of the first to fifth embodiments explained above are mounted in a semiconductor integrated circuit for video processing as follows.

Figure 19:
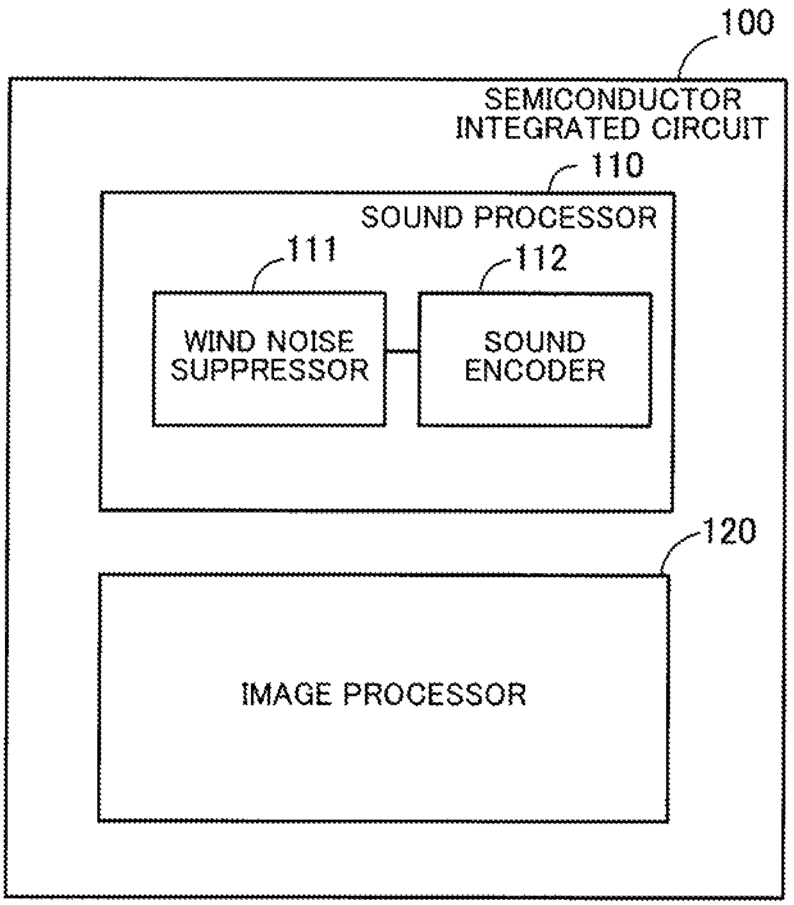
FIG. 19 illustrates an example of a semiconductor integrated circuit for video processing.

FIG. 19 illustrates an example of a semiconductor integrated circuit for video processing.

A semiconductor integrated circuit 100 has a sound processor 110 that performs processing on sound and an image processor 120 that performs processing on image data.

The sound processor 110 has a wind noise suppressor 111 and a sound encoder 112.

The wind noise suppressor 111 has each element of any of the wind noise suppressors 1, 1*a*, 1*b*, 1*c*, and 1*d* of the first to fifth embodiments previously described and inputs an input sound picked up by a microphone, not illustrated schematically, and A/D-converted and suppresses wind noise. The input sound in which wind noise is suppressed is input to the sound encoder 112 and subjected to encoding processing.

According to the semiconductor integrated circuit 100 as described above, by using the wind noise suppressor 111 having any of the functions of the wind noise suppressors 1, 1*a*, 1*b*, 1*c*, and 1*d* previously described, it is possible to obtain a more natural audio signal of quality even when wind noise is suppressed.

According to the wind noise suppressor, the semiconductor integrated circuit, and the wind noise suppression method disclosed herein, it is possible to suppress wind noise so as to make it possible to obtain a more natural sound.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A wind noise suppressor comprising:

a divider that divides a frequency band of an input sound into a first frequency band having a possibility that wind noise is included and a second frequency band having a frequency higher than a frequency of the first frequency band;

a calculator that calculates a probability that the input sound includes wind noise from feature parameters which include an amount of variation in magnitude, a period of variation in magnitude, or a first-order autocorrelation coefficient of a sound in the first frequency band;

a suppressor unit that generates a first input sound with wind noise suppressed, in accordance with an intensity calculated from the probability, in a third frequency band having a stronger possibility that wind noise is included than other frequency bands in the first frequency band;

a compensator that estimates a second input sound in the third frequency band which does not have wind noise on the basis of the first input sound and generates a third input sound by adding the second input sound, in accordance with an intensity calculated from the probability, to the first input sound; and an adder that generates a fourth input sound by mixing the sound in the second frequency band divided by the divider and the third input sound and outputs the fourth input sound.

2. The wind noise suppressor according to claim 1, further comprising an adjuster that adjusts the probability in accordance with an average of the magnitudes of the sound in the first frequency band and the magnitude of the third input sound and supplies the adjusted probability to the compensator.

3. The wind noise suppressor according to claim 1, further comprising another suppressor unit that suppresses the magnitude of the sound in the first frequency band in accordance with an intensity calculated from an amount of attenuation according to the magnitude of the sound in the first frequency band and the probability when the magnitude of the sound in the first frequency band is not less than a predetermined magnitude.

4. The wind noise suppressor according to claim 1, wherein the calculator calculates the probability based on a plurality of feature parameters.

5. A semiconductor integrated circuit, comprising a wind noise suppressor that divides a frequency band of an input sound into a first frequency band having a possibility that wind noise is included and a second frequency band having a frequency higher than a frequency of the first frequency band, calculates a probability that the input sound includes wind noise from feature parameters which include an amount of variation in magnitude, a period of variation in magnitude, or a first-order autocorrelation coefficient of a sound in the first frequency band, generates a first input sound with wind noise suppressed, in accordance with an intensity calculated from the probability, in a third frequency band having a stronger possibility that wind noise is included than other frequency bands in the first frequency band, estimates a second input sound in the third frequency band which does not have wind noise on the basis of the first input sound, generates a third input sound by adding the second input sound, in accordance with an intensity calculated from the probability, to the first input sound, generates a fourth input sound by mixing the sound in the second frequency band and the third input sound, and outputs the fourth input sound.

6. A wind noise suppression method, comprising:

dividing a frequency band of an input sound into a first frequency band having a possibility that wind noise is included and a second frequency band having a frequency higher than a frequency of the first frequency band;

calculating a probability that the input sound includes wind noise from feature parameters which include an amount of variation in magnitude, a period of variation in magnitude, or a first-order autocorrelation coefficient of a sound in the first frequency band;

generating a first input sound with wind noise suppressed, in accordance with an intensity calculated from the probability, in a third frequency band having a stronger possibility that wind noise is included than other frequency bands in the first frequency band;

estimating a second input sound in the third frequency band which does not have wind noise on the basis of the first input sound;

generating a third input sound by adding the second input sound, in accordance with an intensity calculated from the probability, to the first input sound;

generating a fourth input sound by mixing the sound in the second frequency band and the third input sound; and outputting the fourth input sound.

* * * * *